US011932018B2

(12) United States Patent
Matsuyama

(10) Patent No.: US 11,932,018 B2
(45) Date of Patent: Mar. 19, 2024

(54) INKJET RECORDING APPARATUS

(71) Applicant: KYOCERA Document Solutions Inc., Osaka (JP)

(72) Inventor: Ryo Matsuyama, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 81 days.

(21) Appl. No.: 17/692,819

(22) Filed: Mar. 11, 2022

(65) Prior Publication Data

US 2022/0314623 A1 Oct. 6, 2022

(30) Foreign Application Priority Data

Mar. 30, 2021 (JP) ................................ 2021-057091

(51) Int. Cl.
*B41J 2/165* (2006.01)

(52) U.S. Cl.
CPC ....... *B41J 2/16505* (2013.01); *B41J 2/16552* (2013.01)

(58) Field of Classification Search
CPC .......................... B41J 2/16505; B41J 2/16552
See application file for complete search history.

(56) References Cited

U.S. PATENT DOCUMENTS 6,293,648 B1 * 9/2001 Anderson ............ B41J 2/16588 347/29
10,195,859 B2 * 2/2019 Furukawa ............ B41J 2/16505
10,207,507 B2 * 2/2019 Furukawa ............ B41J 2/16552
2020/0009869 A1 * 1/2020 Kage .................... B41J 2/16585

FOREIGN PATENT DOCUMENTS

JP 2019-177528 A 10/2019

* cited by examiner

*Primary Examiner* — Sharon Polk
(74) *Attorney, Agent, or Firm* — Studebaker & Brackett PC

(57) ABSTRACT

An inkjet recording apparatus includes a nozzle surface, a supply port, a conveyance unit, a first moving device, a cap, a second moving device and a controller. The supply port supplies a cleaning liquid for cleaning the nozzle surface. The cap has a recessed part whose upper surface is opened and a discharge port through which the liquid dropped in the recessed part is discharged. The controller controls the first moving device to arrange the nozzle surface and the conveyance unit in a retreat position, then controls the second moving device to arrange the cap, the nozzle surface and the supply port in a covering position, then controls such that the cleaning liquid is discharged from the supply port to the cap, and then controls such that the ink is purged from the nozzle surface to the cap.

5 Claims, 15 Drawing Sheets

INKJET RECORDING APPARATUS

INCORPORATION BY REFERENCE

This application is based on and claims the benefit of priority from Japanese patent application No. 2021-057091 filed on Mar. 30, 2021, which is incorporated by reference in its entirety.

BACKGROUND

The present disclosure relates to an inkjet recording apparatus.

In an inkjet recording apparatus, water may evaporate from ink in the nozzle during a period when an image forming job is not performed, and the nozzle may be clogged due to an increase in viscosity or a drying of the ink. Therefore, a purge processing in which the ink in the nozzle is discharged to a cap is performed for the purpose of preventing the clogging. The waste ink is stored in a waste ink tank connected to the cap.

However, when the waste ink discharged in the purge processing is stayed in the cap, the stayed ink dries and is deposited, and there is a problem that the waste ink overflows from the cap while the purge processing is repeated. Therefore, conventionally, a technique for preventing the waste ink from overflowing from the cap is discussed. For example, a printing apparatus including a cap, an absorbing member disposed in the cap and capable of absorbing ink, and a regulating member disposed between a nozzle formed surface and the absorbing member and suppressing contact of the absorbing member with the nozzle is disclosed.

However, in the configuration described above, the ink is deposited on the absorbing member, and the deposited ink may contact with the head.

SUMMARY

In accordance with an aspect of the present disclosure, an inkjet recording apparatus includes a nozzle surface, a supply port, a conveyance unit, a first moving device, a cap, a second moving device and a controller. A liquid is ejected from the nozzle surface. The supply port supplies a cleaning liquid for cleaning the nozzle surface. The conveyance unit conveys a sheet along a conveyance path facing the nozzle surface. The first moving device arranges the nozzle surface and the conveyance unit in an image forming position in which an image forming operation is performed and a retreat position in which a distance between the nozzle surface and the conveyance unit is larger than the distance in the image forming position. The cap has a recessed part whose upper surface is opened and a discharge port through which the liquid dropped in the recessed part is discharged. The second moving device arranges the cap, the nozzle surface and the supply port in a covering position in which the cap covers the nozzle surface and the supply port and in a non-covering position in which the cap and the nozzle surface are separated from each other. The controller controls the first moving device to arrange the nozzle surface and the conveyance unit in the retreat position, then controls the second moving device to arrange the cap, the nozzle surface and the supply port in the covering position, then controls such that the cleaning liquid is discharged from the supply port to the cap, and then controls such that the ink is purged from the nozzle surface to the cap.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, a printer 1 (an inkjet recording apparatus) according to one embodiment of the present disclosure will be described with reference to the drawings.

Figure 1:
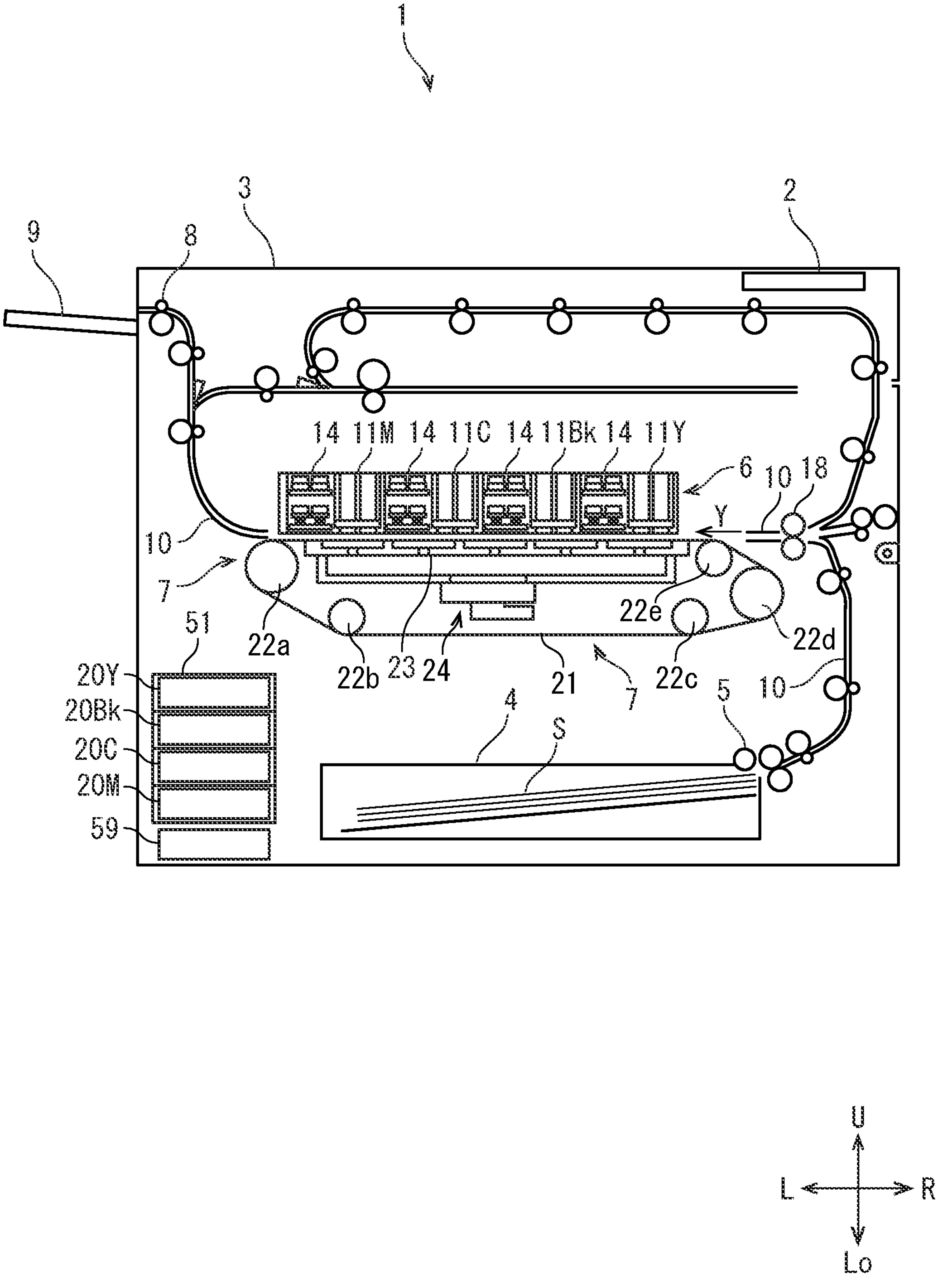
FIG. 1 is a front view schematically showing an inner structure of a printer according to one embodiment of the present disclosure.
Figure 2:
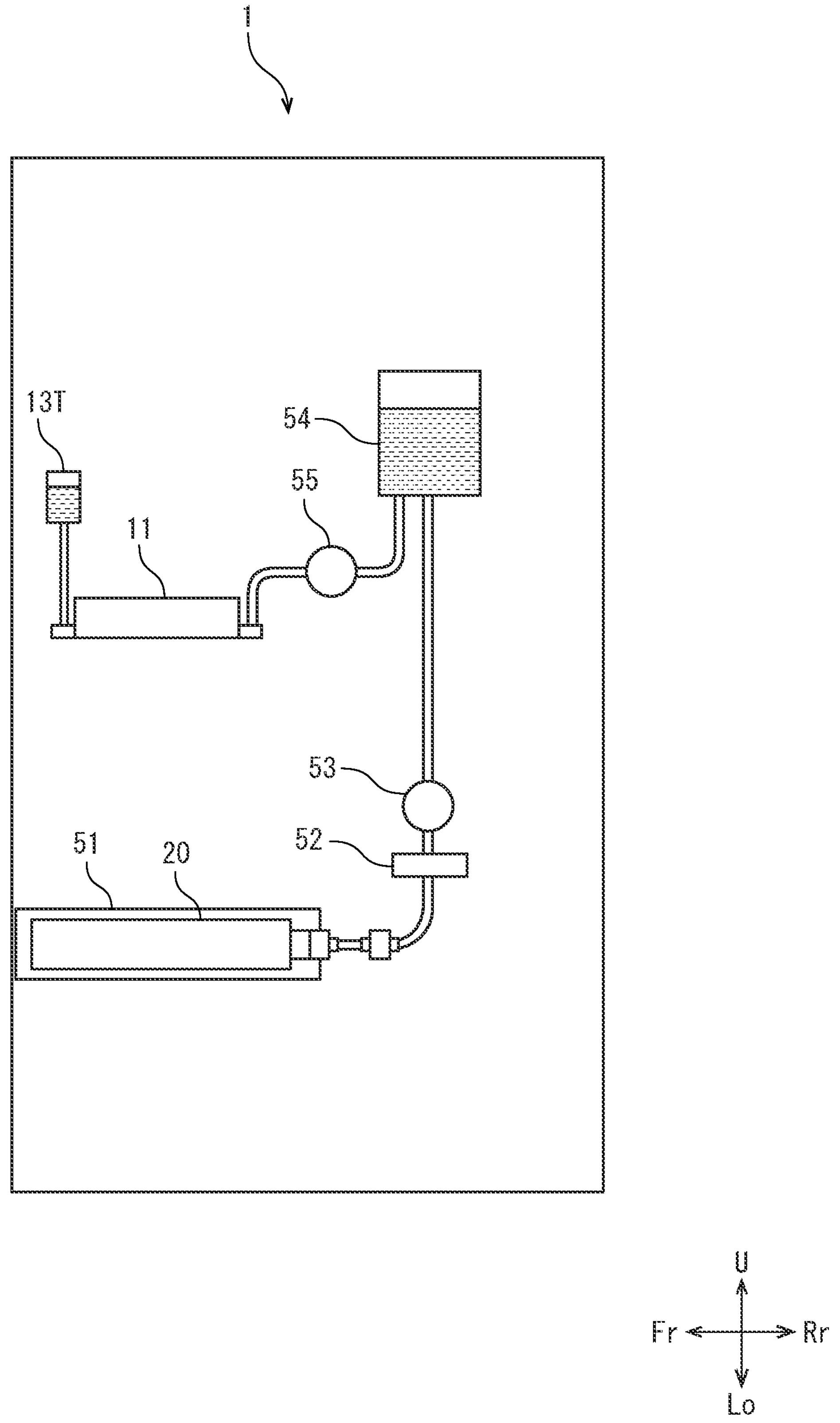
FIG. 2 is a view schematically showing an ink supply passage according to the embodiment of the present disclosure.
Figure 3:
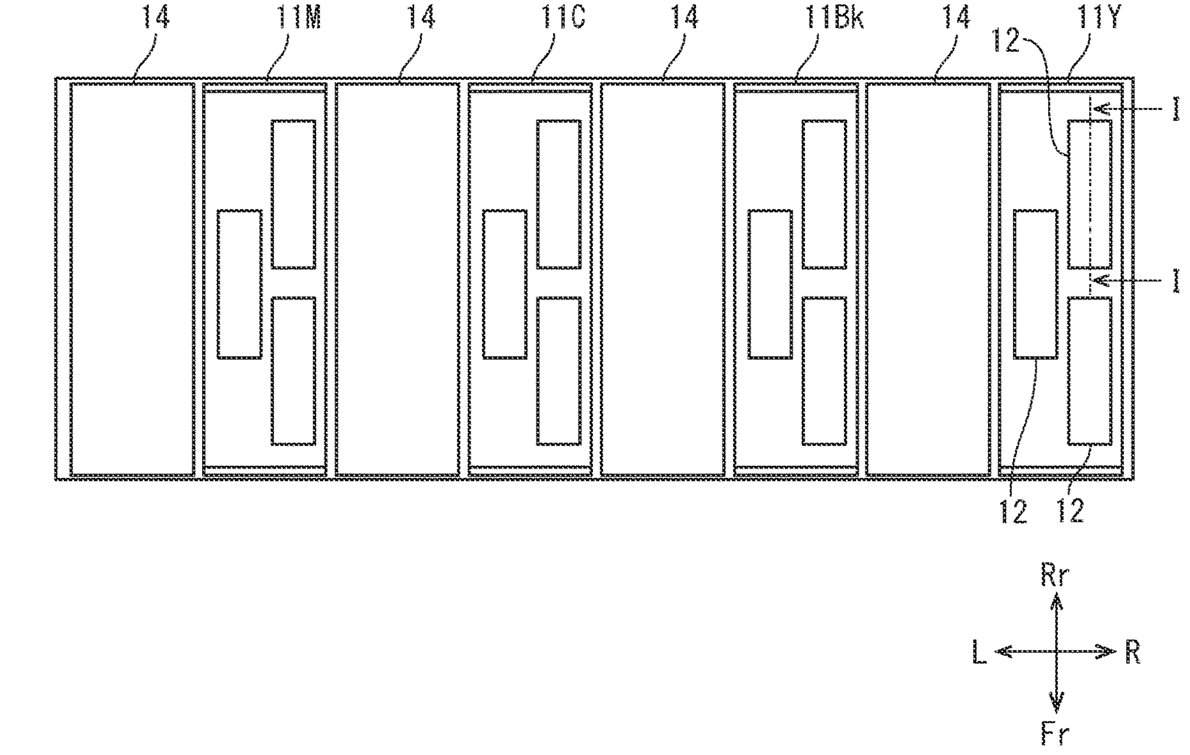
FIG. 3 is a plan view showing an image forming unit according to the embodiment of the present disclosure.
Figure 4:
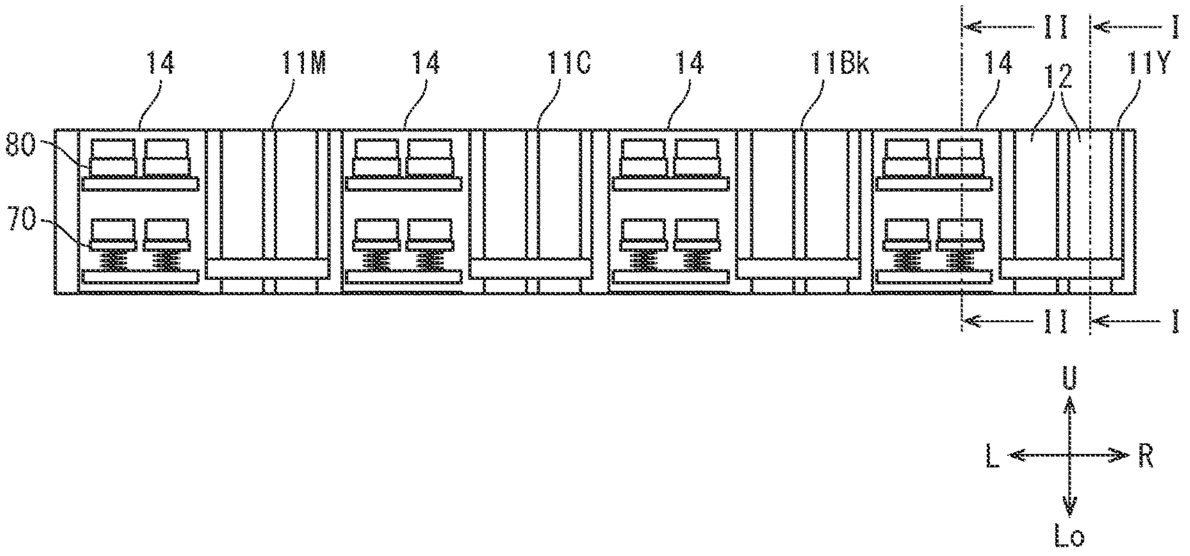
FIG. 4 is a sectional view showing the image forming unit according to the embodiment of the present disclosure.
Figure 5:
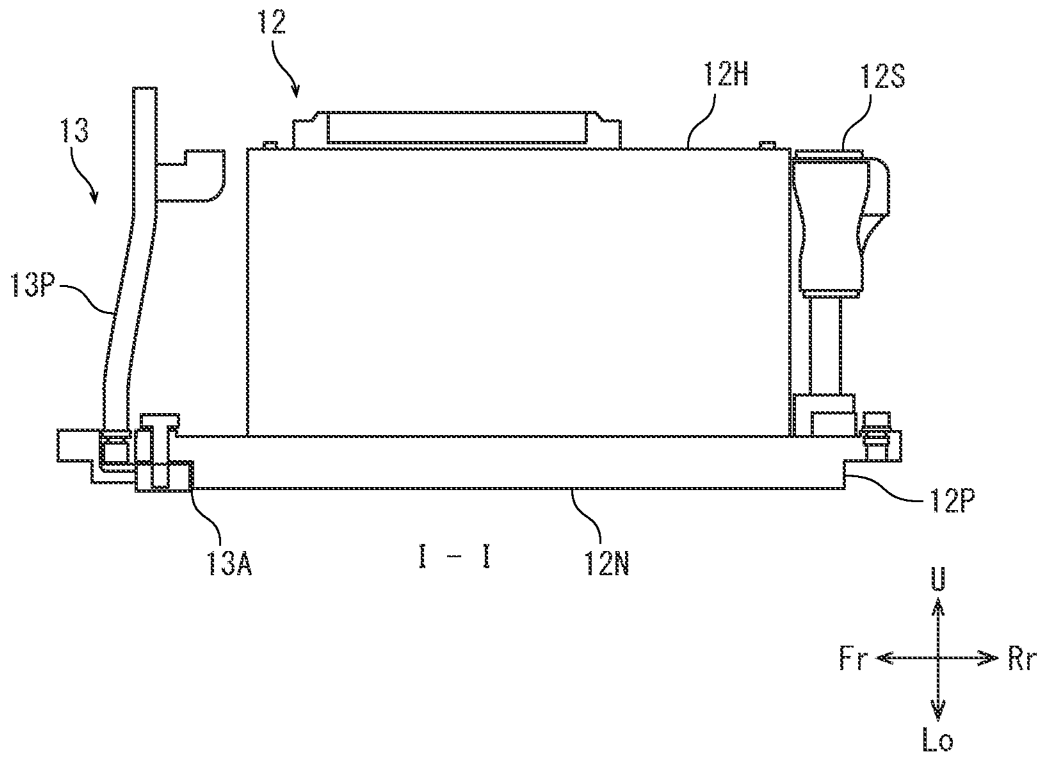
FIG. 5 is a sectional view taken along the line I-I of an inkjet head shown in FIG. 3.

First, an entire structure of the printer 1 will be described. FIG. 1 is a front view schematically showing an inner structure of the printer 1. FIG. 2 is a view schematically showing an ink supply passage. FIG. 3 is a plan view showing an image forming unit 6. FIG. 4 is a sectional view showing the image forming unit 6. FIG. 5 is a sectional view taken along the line I-I of an inkjet head 12 shown in FIG. 3 and FIG. 4. In the following description, a near side (a front side) of a paper surface of FIG. 1 is defined to be a front side of the printer 1, and the left-and-right direction is described based on a direction in which the printer 1 is viewed from the front side. In each figure, U, Lo, L, R, Fr and Rr respectively indicate an upper side, a lower side, a left side, a right side, a front side and a rear side.

The printer 1 is an inkjet type image forming apparatus in which an image is formed by ejecting ink. The printer 1 includes a rectangular parallelepiped main body housing 3. In the lower portion of the main body housing 3, a sheet feeding cassette 4 in which a sheet S such as a plain paper and a coated paper is stored and a sheet feeding roller 5 which feeds the sheet S from the sheet feeding cassette 4 are provided. Above the sheet feeding cassette 4, a conveyance unit 7 which attracts the sheet S and conveys it is provided. Above the conveyance unit 7, an inkjet type image forming unit 6 is provided. In the left upper portion in the main body housing 3, a discharge rollers pair 8 which discharges the sheet S on which an image is formed and a discharge tray 9 on which the discharged sheets S are stacked are provided.

The conveyance unit 7 includes an endless conveyance belt 21, a conveyance plate 23, and a suction part 24. The endless conveyance belt 21 has a large number of air holes (not shown), and is wound around a plurality of rollers 22*a* to 22*e*. The conveyance plate 23 has a large number of air holes, and has an upper surface in contact with the inner surface of the conveyance belt 21. The suction part 24 attracts the sheet S to the conveyance belt 21 by sucking air through the air holes of the conveyance plate 23. When the roller 22*a* is driven by a drive part (not shown) such as a motor, the conveyance belt 21 rotates in the Y direction, and the sheet S attracted to the conveyance belt 21 is conveyed in the Y direction.

The image forming unit 6 includes head units 11Y, 11Bk, 11C and 11M (collectively referred to as a head unit 11) which eject ink of yellow, black, cyan, and magenta, respectively. Ink containers 20Y, 20Bk, 20C and 20M (collectively referred to as an ink container 20) filled with the ink of yellow, black, cyan and magenta are connected to the head units 11Y, 11Bk, 11C and 11M, respectively.

The head unit 11 includes one or more inkjet heads 12, for example, a plurality of inkjet heads 12 arranged in a zigzag pattern (see FIG. 3 to FIG. 5). The inkjet head 12 includes a rectangular parallelepiped housing 12H whose longitudinal direction is along the front-and-rear direction, and a nozzle plate 12P provided on the bottom of the housing 12H. The nozzle plate 12P has a large number of nozzles (not shown) arranged in the front-and-rear direction (the width direction of the conveyance belt 21 crossing the conveyance direction of the conveyance belt 21), and the ejection ports of the nozzles are provided on the lower surface (a nozzle surface 12N) of the nozzle plate 12P. Each nozzle is provided with a piezoelectric element, and a drive circuit (not shown) for driving the piezoelectric element is provided inside the housing 12H.

The printer 1 includes an ink supply passage shown in FIG. 2. In the figure, the supply passage corresponding to the ink of one color is shown, but in this embodiment, since the ink of four colors are used, four similar supply passages are provided. The printer 1 includes a container attachment part 51, a filter 52, a pump 53, a sub-tank 54 and a pump 55. To the container attachment part 51, the ink container 20 is attached. The filter 52 filters the ink. The pump 53 sucks the ink from the ink container 20 through the filter 52. The sub-tank 54 stores the ink fed from the pump 53. The pump 55 supplies the ink stored in the sub-tank 54 to the head unit 11. The pump 55 is connected to a socket 12S provided in the inkjet head 12.

In the main body housing 3, a conveyance path 10 is provided from the sheet feeding cassette 4 to the discharge tray 9 via the conveyance unit 7. On the conveyance path 10, a plurality of conveyance rollers pairs 17 for conveying the sheet S is provided. On the upstream side of the image forming unit 6 in the conveyance direction, a registration rollers pair 18 is provided.

Each part of the printer 1 is controlled by a controller 2. The controller 2 includes a processor and a memory. The processor is a central processing unit (CPU), for example. The memory includes a storage medium such as a ROM (Read Only Memory), a RAM (Random Access Memory), and an EEPROM (Electrically Erasable Programmable Read Only Memory). The processor reads and executes the control program stored in the memory to execute various processes. The controller 2 may be achieved by an integrated circuit that does not use software.

The basic image forming operation of the printer 1 is as follows. When an image forming job is inputted to the printer 1 from an external computer or the like, the sheet feeding roller 5 feeds the sheet S from the sheet feeding cassette 4 to the conveyance path 10, and the registration rollers pair 18 whose rotation is stopped corrects the skew of the sheet S. When the registration rollers pair 18 feeds the sheet S to the conveyance unit 7 at a predetermined timing, the conveyance unit 7 attracts the sheet S to the conveyance belt 21 and conveys it in the Y direction. When the controller 2 supplies gradation data corresponding to each nozzle of the inkjet head 12 to the drive circuit in synchronization with the conveyance of the sheet S, the drive circuit supplies a drive signal corresponding to the gradation data to the piezoelectric elements to eject the ink droplets from the nozzles and to form an image on the sheet S. The discharge rollers pair 8 discharges the sheet S on which the image is formed to the discharge tray 9.

Figure 6:
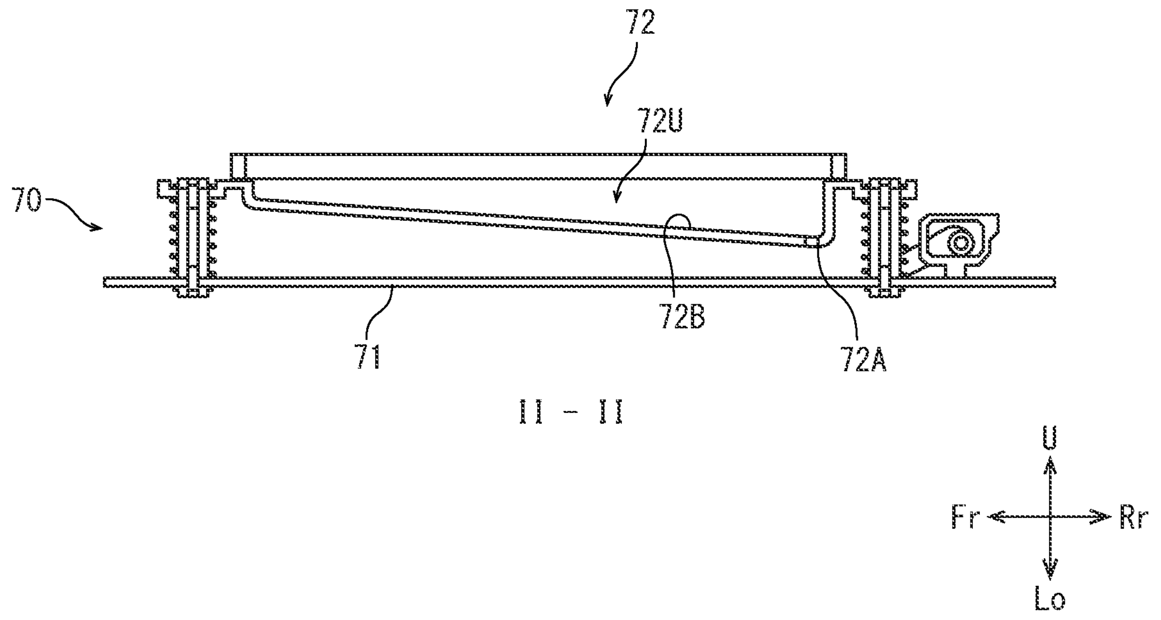
FIG. 6 is a sectional view taken along the line II-II of the capping unit shown in FIG. 4.
Figure 7:
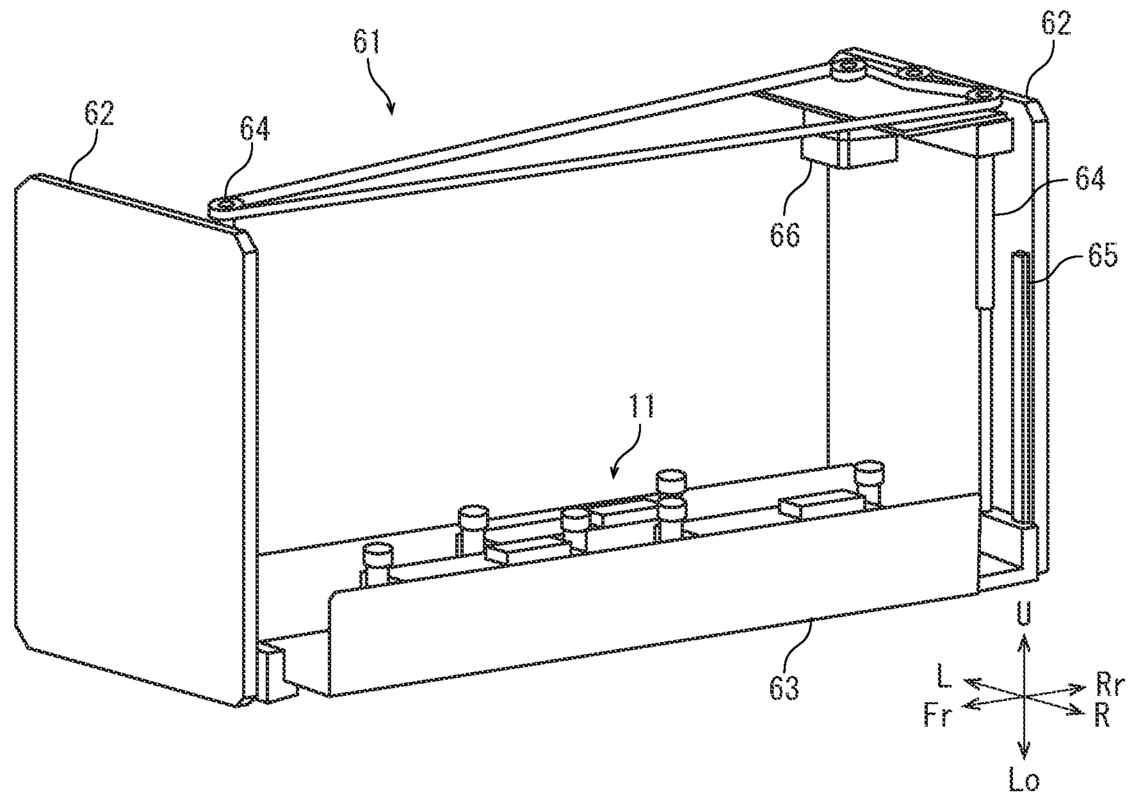
FIG. 7 is a perspective view showing a head lifting device according to the embodiment of the present disclosure.
Figure 8:
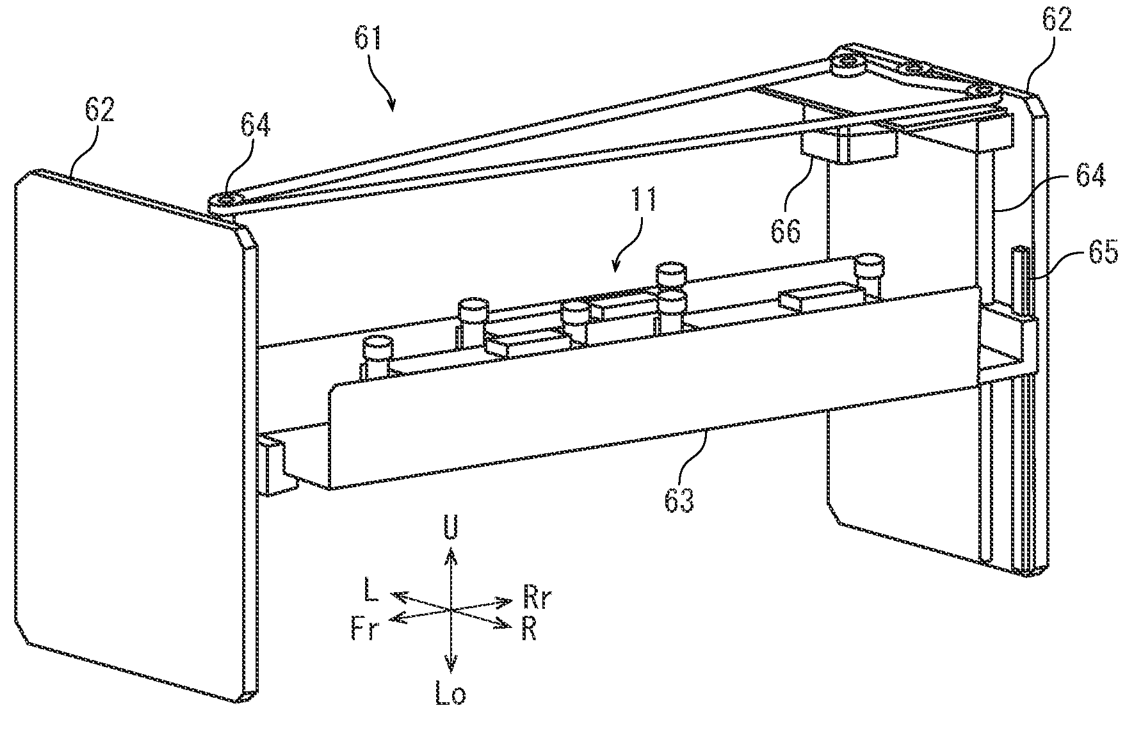
FIG. 8 is a perspective view showing the head lifting device according to the embodiment of the present disclosure.
Figure 9:
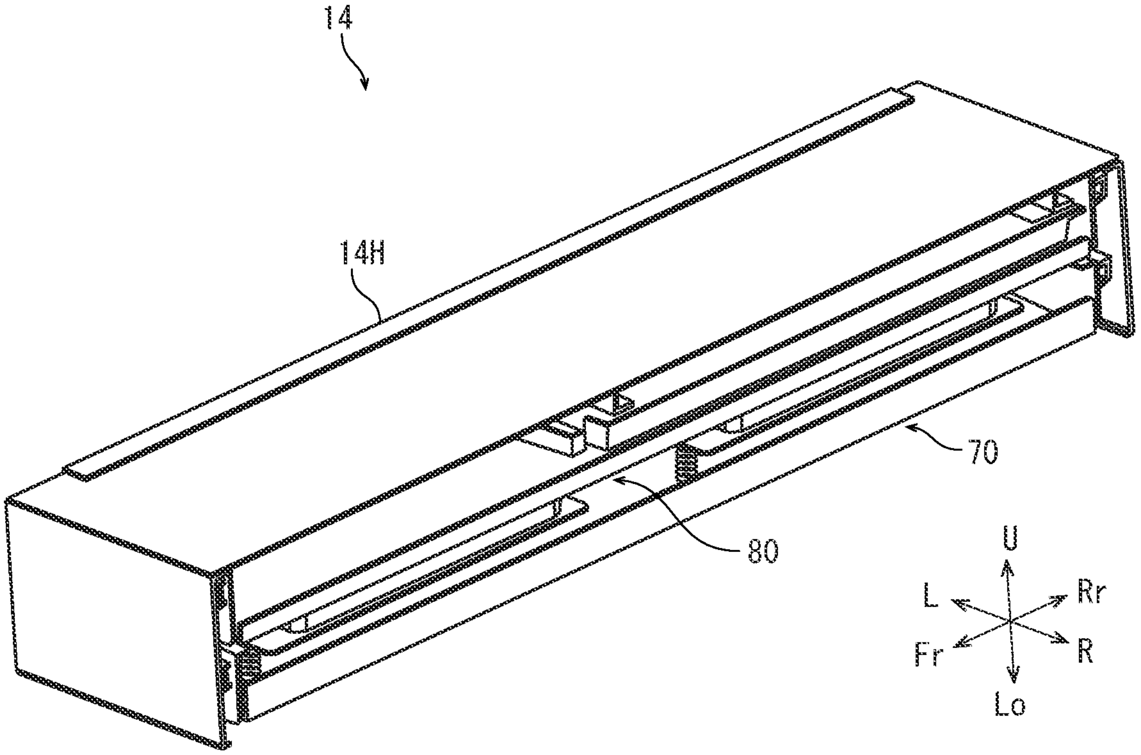
FIG. 9 is a perspective view showing a maintenance unit according to the embodiment of the present disclosure.
Figure 10:
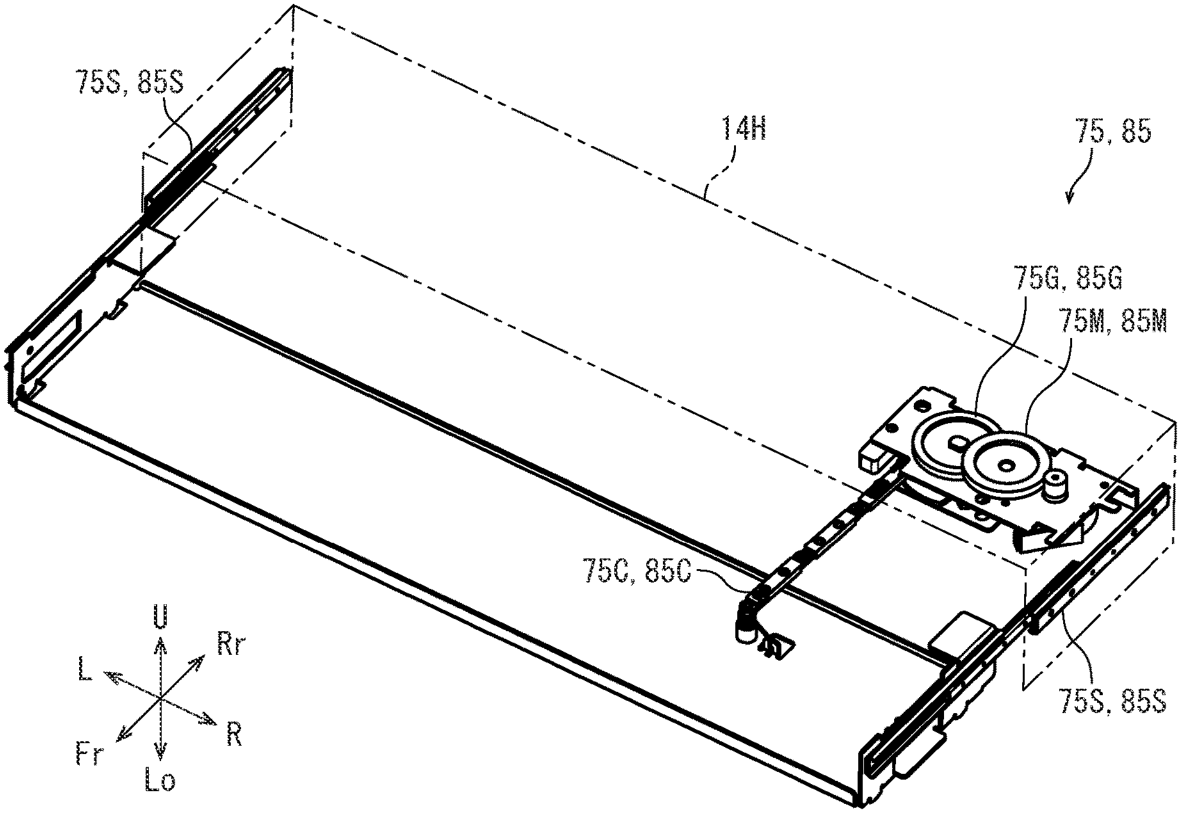
FIG. 10 is a perspective view showing a first sliding device and a second sliding device according to the embodiment of the present disclosure.
Figure 11:
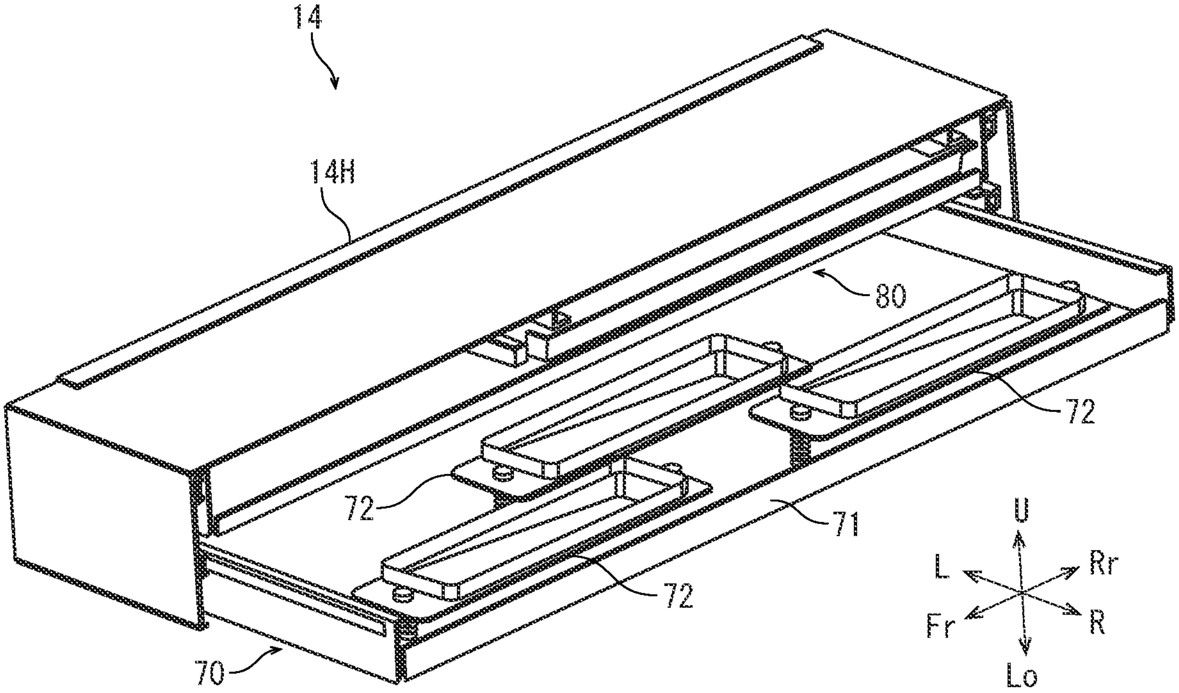
FIG. 11 is a perspective view showing the capping unit disposed in a covering position, in the embodiment of the present disclosure.
Figure 12:
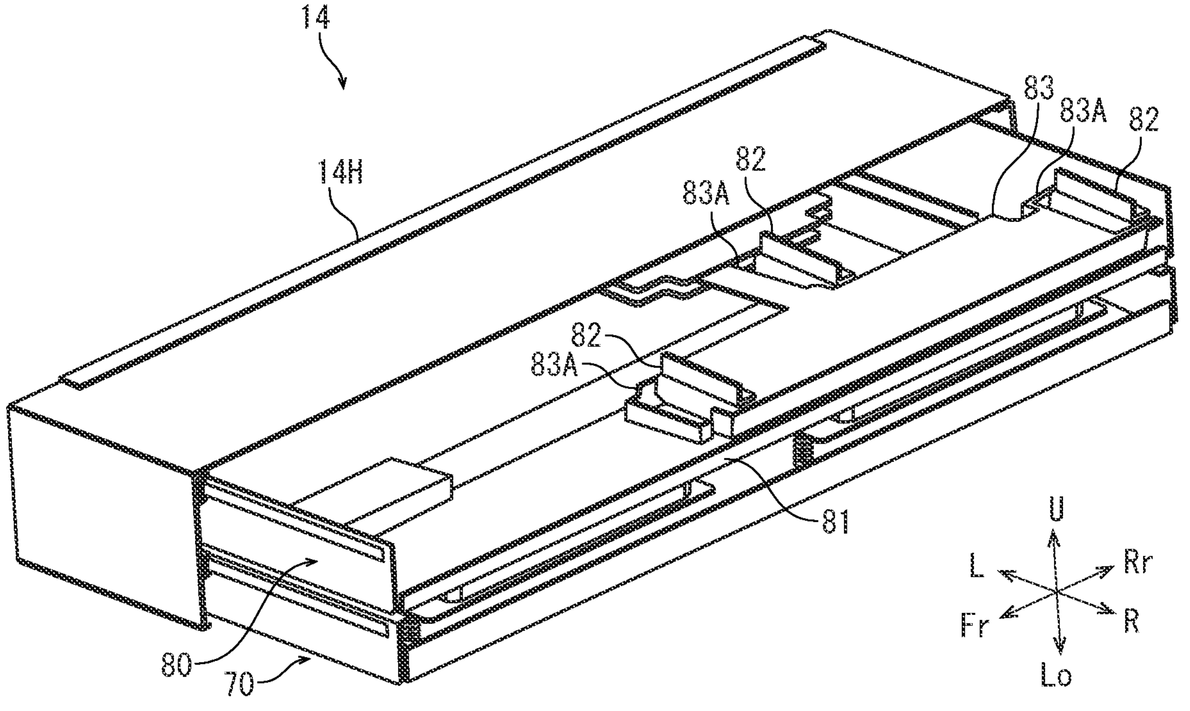
FIG. 12 is a perspective view showing a cleaning unit disposed in a cleaning position, in the embodiment of the present disclosure.
Figure 13:
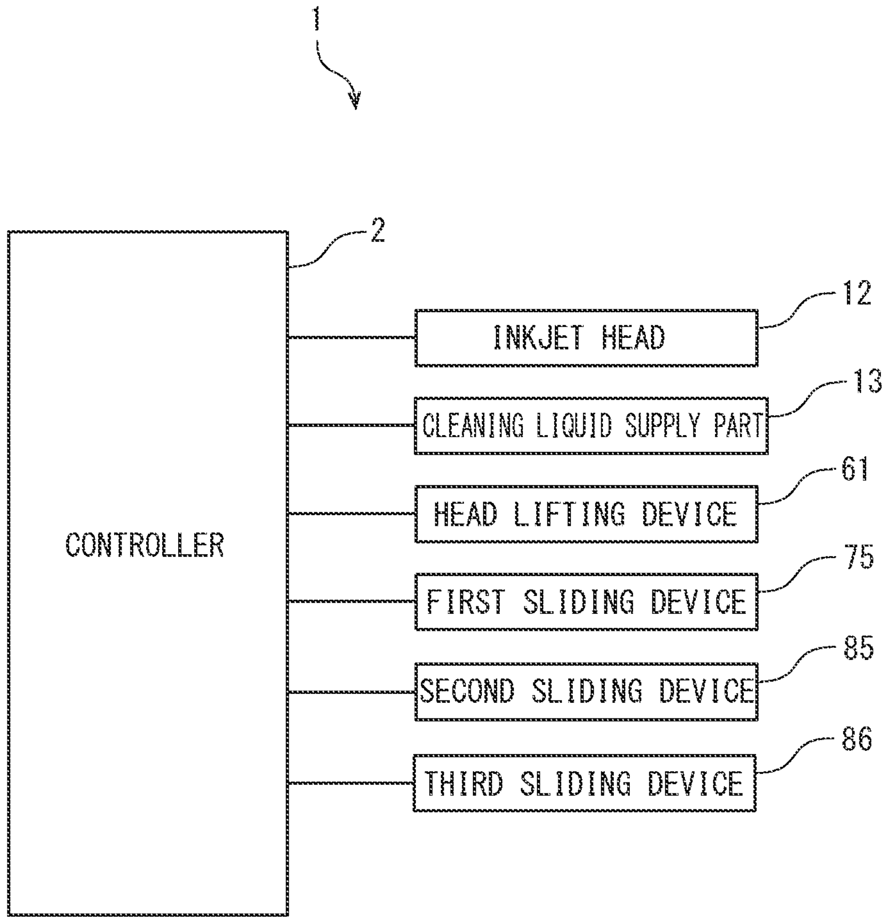
FIG. 13 is a block diagram showing an electrical structure of the printer according to embodiment of the present disclosure.
Figure 14:
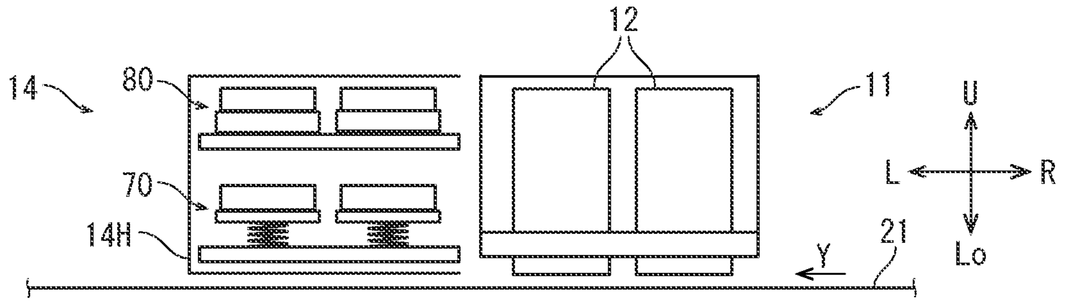
FIG. 14 is a sectional view explaining an operation of the printer according to the embodiment of the present disclosure.

Next, a configuration regarding the maintenance of the inkjet head 12 will be described in detail. FIG. 6 is a sectional view taken along the line II-II of a capping unit 70 shown in FIG. 4. FIG. 7 and FIG. 8 are perspective views showing a head lifting device 61 (a first moving device). FIG. 9 is a perspective view showing a maintenance unit 14. FIG. 10 is a perspective view showing a first sliding device 75 and a second sliding device 85. FIG. 11 is a perspective view showing the capping unit 70 disposed in a covering position. FIG. 12 is a perspective view showing a cleaning unit 80 disposed in a cleaning position. FIG. 13 is a block diagram showing an electrical structure of the printer 1.

The printer 1 includes the nozzle surface 12N, a supply port 13A, the conveyance unit 7, the first moving device (the head lifting device 61), a cap 72, a second moving device (the first sliding device 75 and the head lifting device 61), and the controller 2. The nozzle surface 12N ejects a liquid. The supply port 13A supplies a cleaning liquid for cleaning the nozzle surface 12N. The conveyance unit 7 conveys the sheet S along the conveyance path 10 facing the nozzle surface 12N. The first moving device (the head lifting device 61) can arrange the nozzle surface 12N and the conveyance unit 7 in either of an image forming position in which the image forming operation is performed and a retreat position in which a distance between the nozzle surface 12N and the conveyance unit 7 is larger than that in the image forming position. The cap 72 has a recessed part 72U whose upper surface is opened and a discharge port 72A through which the liquid dropped into the recessed part 72U is discharged. The second moving device (the first sliding device 75 and the head lifting device 61) can arrange the cap 72, the nozzle surface 12N and the supply port 13A in either of a covering position in which the cap 72 covers the nozzle surface 12N and the supply port 13A and a non-covering position in which the cap 72 separates from the nozzle surface 12N. The controller 2 controls the first moving device to arrange the nozzle surface 12N and the conveyance unit 7 to the retreat position, then controls the second moving device to arrange the cap 72, the nozzle surface 12N and the supply port 13A to the covering position, then controls such that the cleaning liquid is discharged from the supply port 13A to the cap 72, and then controls such that the ink is purged from the nozzle surface 12N to the cap 72.

More specifically, the printer 1 includes the inkjet head 12. The inkjet head 12 has the nozzle surface 12N. The inkjet head 12 is controlled by the controller 2 to eject the ink or purge the ink from the nozzle surface 12N. The printer 1 includes a cleaning liquid supply part 13. The cleaning liquid supply part 13 has the supply port 13A, is controlled by the controller 2 to discharge the cleaning liquid from the supply port 13A. The supply port 13A may be provided on the nozzle surface 12N. That is, the supply port 13A may be a part of the inkjet head 12. Alternatively, the supply port 13A may be provided adjacent to the nozzle surface 12N. The cleaning liquid supply part 13 may be provided adjacent to the inkjet head 12 or may be a part of the inkjet head 12. In a case where the cleaning liquid supply part 13 is not a part of the inkjet head 12, the cleaning liquid supply part 13 may be disposed adjacent to the inkjet head 12 only when a wiping operation is performed by a wiper blade 82 described later. That is, when the wiping operation is not performed, the cleaning liquid supply part 13 may be disposed away from the inkjet head 12.

The first moving device may move only one of the inkjet head 12 and the conveyance unit 7 or may move both of them. In this embodiment, since the first moving device lifts and lowers the inkjet head 12, it may be referred to as the head lifting device 61. The head lifting device 61 lifts and lowers the inkjet head 12 between an image forming position where the image forming operation is performed and a retreat position above the image forming position.

The second moving device may move any one of the cap 72, the nozzle surface 12N, and the supply port 13A, or may move all of them. In this embodiment, the second moving device includes the first sliding device 75 which slides the cap 72, and the head lifting device 61 which lifts and lowers the inkjet head 12 having the nozzle surface 12N and the supply port 13A.

[Cleaning Liquid Supply Part] In front of the inkjet head 12, the cleaning liquid supply part 13 is provided (see FIG. 5). The cleaning liquid supply part 13 includes a cleaning liquid tank 13T (see FIG. 2) in which the cleaning liquid is contained, the supply port 13A provided in the nozzle plate 12P, and a pipe 13P connecting the cleaning liquid tank 13T and the supply port 13A. The supply port 13A is provided at a position adjacent to the front end portion of the nozzle surface 12N of the inkjet head 12. A plurality of supply ports 13A may be provided along the left-and-right direction. The supply port 13A is formed into a thin tubular shape in such a degree that a concave meniscus is formed by a capillary phenomenon. The cleaning liquid is a component obtained by removing coloring material (pigment, dye and the like) from the ink, for example.

The cleaning liquid is supplied by forming a convex meniscus in the supply port 13A. For example, a tank lifting device (not shown) for lifting and lowering the cleaning liquid tank 13T is provided, and by lifting the cleaning liquid tank 13T such that the liquid surface of the cleaning liquid in the cleaning liquid tank 13T is higher than the supply port 13A, the convex meniscus is formed in the supply port 13A, and the cleaning liquid is expanded from the supply port 13A in a hemispherical shape. The expanded cleaning liquid is wiped off by the wiper blade 82 described later to supply the cleaning liquid on the nozzle surface 12N. Further, by lifting the cleaning liquid tank 13T to a higher position, the cleaning liquid is discharged to the cap 72 described later. The cleaning liquid supply part 13 may be configured to discharge the cleaning liquid using a piezoelectric element, a diaphragm pump, or the like.

As described above, the supply port 13A supplies the cleaning liquid for cleaning the nozzle surface 12N. Further, the supply port 13A supplies the cleaning liquid on the nozzle surface 12N. This includes that the cleaning liquid moved by the wiper blade 82 reaches the nozzle surface 12N, that the cleaning liquid is directly supplied on the nozzle surface 12N, and that the cleaning liquid flowed out from the supply port 13A naturally flows or spreads to reach the nozzle surface 12N.

[First Moving Device] The first moving device (the head lifting device 61, see FIG. 7 and FIG. 8) lifts and lowers the head unit 11. Specifically, the head lifting device 61 includes a pair of frames 62 facing each other in the front-and-rear direction, a carriage 63 which supports the head unit 11, ball screws 64 whose axial direction is along the upper-and-lower direction, guide parts 65 which guides the lifting and lowering of the carriage 63, and a drive part 66 which drives the ball screws 64. The guide part 65 is a protruded portion provided on the inner surface of each of the front and rear frames 62 along the upper-and-lower direction. At both the front and rear end portions of the carriage 63, grooves (not shown) fitted to the guide parts 65 are formed. At both the front and rear end portions of the carriage 63, female screws corresponding to the male screws of the ball screws 64 are formed. The drive part 66 includes a motor, a drive pulley provided on the shaft of the motor, driven pulleys provided on the upper end portions of the ball screws 64, and a belt wound around the drive pulley and the driven pulleys. The drive part 66 lifts and lowers the carriage 63 with respect to the frames 62 by rotating the ball screws 64. The head lifting device 61 may be a rack and pinion, a linear motor, or the like.

The head lifting device 61 lifts and lowers the head unit 11 between the image forming position where the image forming operation is performed and the retreat position above the image forming position. In the image forming position, the head unit 11 is positioned so that a distance between the conveyance belt 21 and the nozzle surface 12N is about 1 mm. In the retreat position, a space in which the capping unit 70 and the cleaning unit 80 are moved is formed between the conveyance belt 21 and the nozzle surface 12N.

[Maintenance Unit] The maintenance unit 14 (see, FIG. 3, FIG. 4, and FIG. 9 to FIG. 12) includes the capping unit 70, the first sliding device 75 (see FIG. 10) which slides the capping unit 70, the cleaning unit 80, the second sliding device 85 which slides the cleaning unit 80, and a housing 14H in which the capping unit 70 and the cleaning unit 80 are housed. The housing 14H is formed into a parallelepiped shape whose longitudinal direction is along the front-and-rear direction, and on the right side surface of the housing 14H, an opening through which the capping unit 70 and the cleaning unit 80 enter and leave. The maintenance unit 14 is provided for each head unit 11 on the left side of each head unit 11. The maintenance unit 14 may be provided on the right side of each head unit 11, and the opening may be provided in the left side surface of the housing 14H.

[Capping Unit] The capping unit 70 (see FIG. 4, FIG. 6 and FIG. 11) includes a support plate 71, and the caps 72 provided on the upper surface of the support plate 71. On the support plate 71, the caps 72 of the same number as the inkjet heads 12 are arranged in a zigzag pattern in the same manner as the inkjet heads 12. The cap 72 has the recessed part 72U whose upper surface is opened and the discharge port 72A provided in the recessed part 72U. The recessed part 72U has a size capable of surrounding the nozzle surface 12N of one inkjet head 12 and the supply port 13A of the cleaning liquid supply part 13. At least the upper end portion of the recessed part 72U is made of resin such as rubber.

The discharge port 72A may be disposed on the side surface of the recessed part 72U, but if it is disposed on the bottom portion 72B of the recessed part 72U, the liquid in the recessed part 72U is easily discharged. The discharge port 72A is disposed at a position lower than the bottom portion 72B of the recessed part 72U at a position facing the supply port 13A when the cap 72 and the supply port 13A are positioned in the covering position. Further, the bottom portion 72B of the recessed part 72U is inclined so as to be lower from a position facing the supply port 13A when the cap 72 and the supply port 13A are positioned in the covering position toward a position where the discharge port 72A is disposed. Specifically, the bottom portion 72B of the recess part 72U is inclined in one direction so that the front side (an example of a side facing the supply port 13A) is high, and the discharge port 72A is provided on the rear side (an example of a low side of the bottom portion 72B). A waste ink tank 59 is connected to the discharge port 72A (see FIG. 1).

[Second Moving Device] In this embodiment, the second moving device includes the first sliding device 75 (see FIG. 10) which slides the cap 72, and the head lifting device 61 which lifts and lowers the inkjet head 12. The first sliding device 75 slides the capping unit 70 between a facing position where the capping unit 70 faces the nozzle surface 12N and a non-facing position where the capping unit 70 does not face the nozzle surface 12N. The covering position in which the cap 72 covers the nozzle surface 12N and the supply port 13A is set by bringing the inkjet head 12 lowered by the head lifting device 61 into contact with the cap 72 positioned in the facing position. When the nozzle surface 12N is positioned in the image forming position, the capping unit 70 is positioned in the non-facing position.

The first sliding device 75 includes slide rails 75S, a motor 75M, a reduction gear 75G, and a chain 75C. The support plate 71 is supported by the housing 14H via the slide rails 75S, and is slidable in the left-and-right direction with respect to the housing 14H. One end of the chain 75C is coupled to the shaft of the reduction gear 75G, and the other end is coupled to the support plate 71. When the motor 75M is rotated normally, the chain 75C is wound around the shaft of the reduction gear 75G, and the capping unit 70 is housed in the housing 14H and moved to the non-facing position. When the motor 75M is rotated reversely, the chain 75C is fed out from the shaft of the reduction gear 75G, and the capping unit 70 leaves the housing 14H and is moved to the facing position.

[Cleaning Unit] The cleaning unit 80 (see FIG. 4 and FIG. 12) includes a support plate 81, a carriage 83 provided above the support plate 81, wiper blades 82 projecting upward from the carriage 83, and a third sliding device 86 (see FIG. 13) which slides the carriage 83. In the carriage 83, the same number of wiper blades 82 as the inkjet heads 12 are arranged in a zigzag pattern in the same manner as the inkjet heads 12. The carriage 83 has a hollow structure, and an opening 83A is provided in front of each wiper blade 82. The carriage 83 is supported by the support plate 81, and slidable in the front-and-rear direction with respect to the support plate 81. The third sliding device 86 is a device which moves the carriage 83 in the front-and-rear direction with respect to the support plate 81, such as a device which drives a wire connected to the carriage 83 by a pulley, a rack and pinion, a ball screw, a linear motor and the like. A discharge port (not shown) is provided on the bottom portion of the carriage 83, and the waste ink tank 59 is connected to the discharge port.

[Third Moving Device] The third moving device can arrange the cleaning unit 80 and the nozzle surface 12N in either of a cleaning position in which the cleaning unit 80 cleans the nozzle surface 12N and a non-cleaning position in which the cleaning unit 80 and the nozzle surface 12N are separated from each other than the cleaning position. The third moving device may move only one of the cleaning unit 80 and the nozzle surface 12N or may move both of them.

In this embodiment, the third moving device includes the second sliding device 85 (see FIG. 10) which slides the cleaning unit 80, and the head lifting device 61 which lifts and lowers the inkjet head 12 having the nozzle surface 12N. The second sliding device 85 slides the cleaning unit 80 between a facing position where the cleaning unit 80 faces the nozzle surface 12N and a non-facing position where the cleaning unit 80 does not face the nozzle surface 12N. The cleaning position in which the cleaning unit 80 cleans the nozzle surface 12N is set by aligning the inkjet head 12 with respect to the cleaning unit 80 positioned in the facing position in the upper-and-lower direction by the head lifting device 61 as required. When the nozzle surface 12N is positioned in the image forming position, the cleaning unit 80 is positioned in the non-facing position.

The second sliding device 85 includes slide rails 85S, a motor 85M, a reduction gear 85G, and a chain 85C. The support plate 81 is supported by the housing 14H via the slide rails 85S, and is slidable in the left-and-right direction with respect to the housing 14H. One end of the chain 85C is coupled to the shaft of the reduction gear 85G, and the other end is coupled to the support plate 81. When the motor 85M is rotated normally, the chain 85C is wound around the shaft of the reduction gear 85G, and the cleaning unit 80 is housed in the housing 14H and moved to the non-facing position. When the motor 85M is rotated reversely, the chain 85C is fed out from the shaft of the reduction gear 85G, and the cleaning unit 80 leaves the housing 14H and is moved to the facing position.

[Electrical Structure] To the controller 2, the inkjet head 12, the cleaning liquid supply part 13, the head lifting device 61, the first sliding device 75, the second sliding device 85 and the third sliding device 86 are connected. The controller 2 controls the inkjet head 12, the cleaning liquid supply part 13, the head lifting device 61, the first sliding device 75, the second sliding device 85 and the third sliding device 86 at prescribed timing to perform a maintenance processing.

Figure 18:
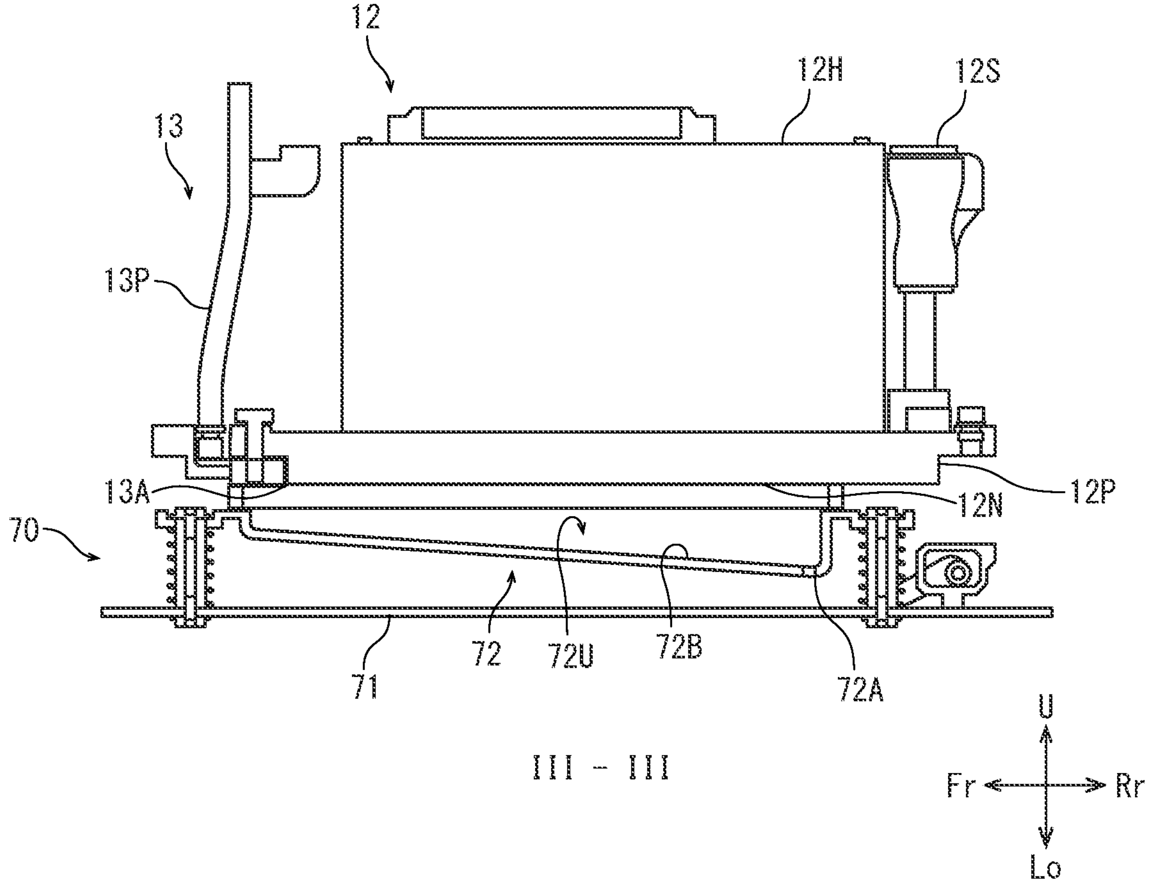
FIG. 18 is a sectional view explaining the operation of the printer according to the embodiment of the present disclosure.

Next, an operation of the printer 1 regarding the purge processing will be described. FIG. 14 to FIG. 21 are sectional views showing the printer 1 during the purge processing. FIG. 18 is a sectional view taken along the line III-III of FIG. 17. Here, one set of the head unit 11 and the maintenance unit 14 is shown, but the other three sets of the head unit 11 and the maintenance unit 14 operate in the same manner. Hereinafter, a state in which the head unit 11 is positioned at the image forming position (see FIG. 14) will be described as an initial state.

Figure 15:
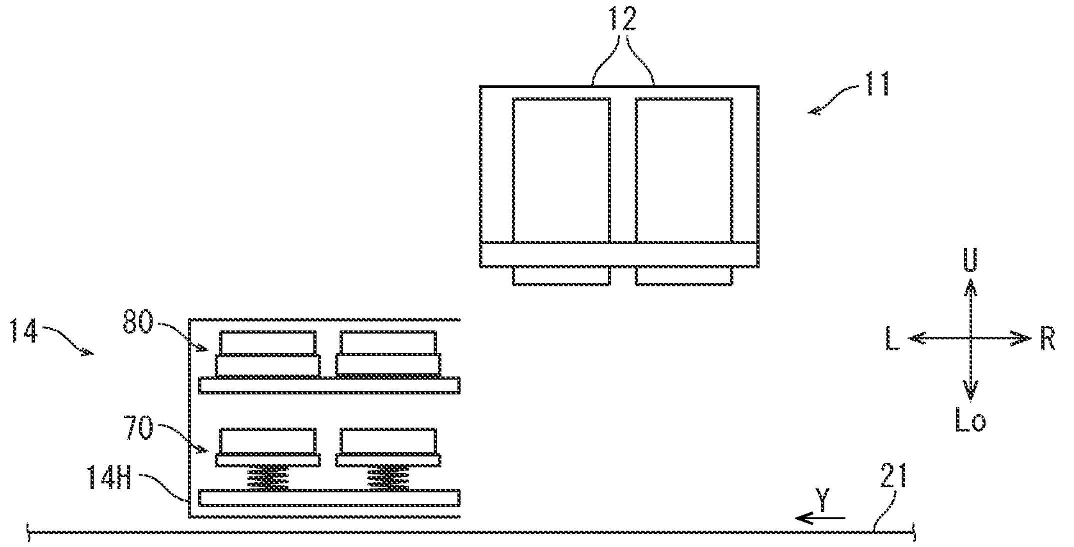
FIG. 15 is a sectional view explaining the operation of the printer according to the embodiment of the present disclosure.
Figure 16:
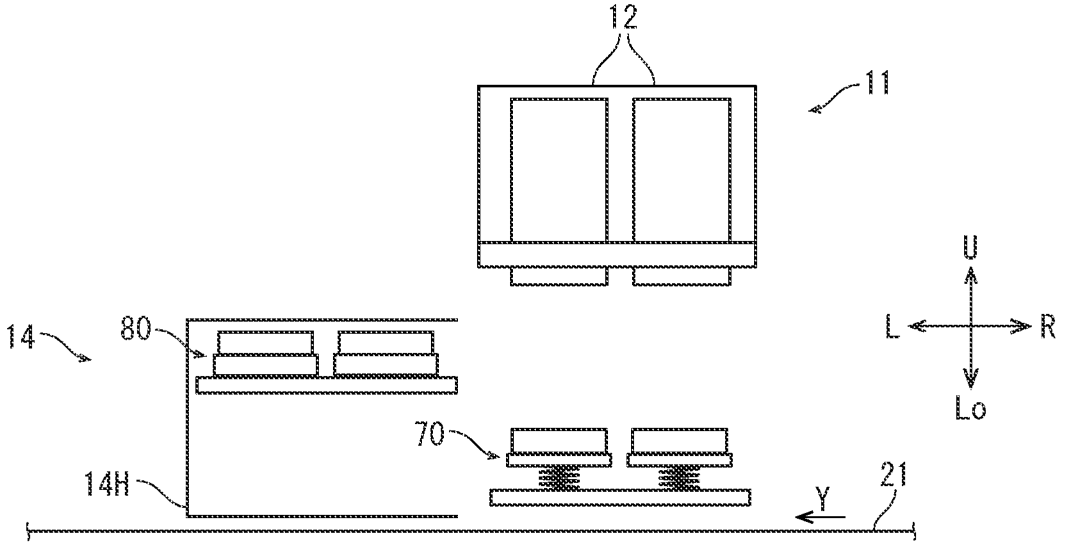
FIG. 16 is a sectional view explaining the operation of the printer according to the embodiment of the present disclosure.
Figure 17:
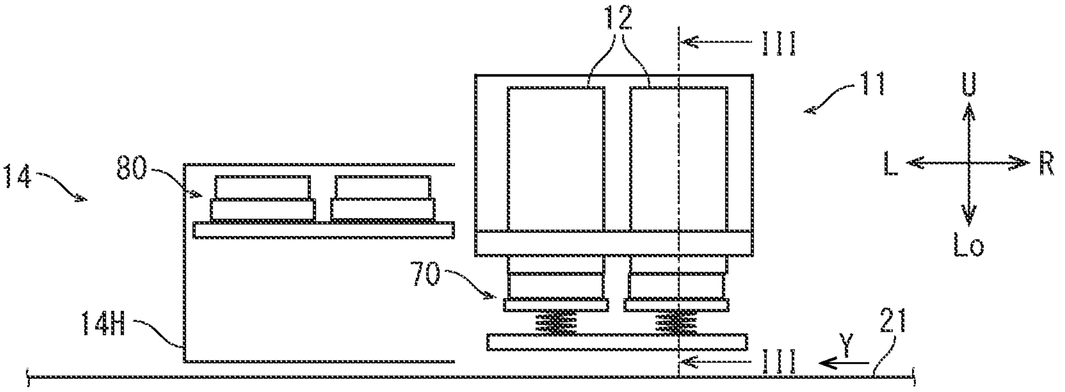
FIG. 17 is a sectional view explaining the operation of the printer according to the embodiment of the present disclosure.

First, the controller 2 controls the first moving device (the head lifting device 61) to lift the head unit 11 to the retreat position (see FIG. 15). Next, the controller 2 controls the first sliding device 75 to slide the capping unit 70 to the facing position (see FIG. 16). Next, the controller 2 controls the head lifting device 61 to lower the head unit 11 to a height where the nozzle surface 12N comes into contact with the cap 72 (see FIG. 17 and FIG. 18). That is, the controller 2 controls the second moving device (the first sliding device 75 and the head lifting device 61) to arrange the cap 72, the nozzle surface 12N, and the supply port 13A in the covering position.

Next, the controller 2 controls the cleaning liquid supply part 13 to discharge the cleaning liquid to the cap 72. Specifically, the controller 2 controls the tank lifting device (not shown) to lift the cleaning liquid tank 13T, thereby discharging the cleaning liquid to the cap 72. Since the discharged cleaning liquid flows from the high side to the low side of the bottom portion 72B of the recessed part 72U, the cleaning liquid adheres over the entire surface of the bottom portion 72B.

Next, the controller 2 controls the inkjet head 12 to purge the ink to the cap 72. The purged ink is diluted by the cleaning liquid, flows from the high side to the low side of the bottom portion 72B of the recessed part 72U, and is stored in the waste ink tank 73 through the discharge port 72A.

Figure 19:
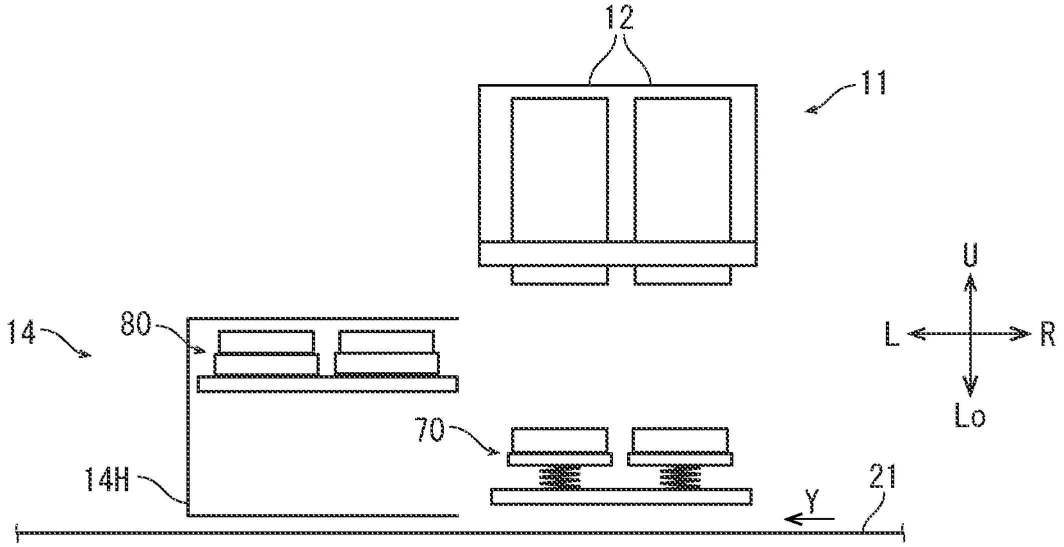
FIG. 19 is a sectional view explaining the operation of the printer according to the embodiment of the present disclosure.

Next, the controller 2 controls the first moving device (the head lifting device 61) to lift the head unit 11 to the retreat position (see FIG. 19). Next, the controller 2 controls the second sliding device 85 to slide the cleaning unit 80 to the facing position (see FIG. 20). Next, the controller 2 controls the head lifting device 61 to lower the head unit 11 to a height at which the nozzle surface 12N comes into contact with the wiper blade 82 (see FIG. 21). That is, the controller 2 controls the third moving device (the second sliding device 85 and the head lifting device 61) to arrange the cleaning unit 80 and the nozzle surface 12N in the cleaning position.

Next, the controller 2 controls the cleaning liquid supply part 15 and the cleaning unit 80 to clean the nozzle surface 12N. Specifically, the controller 2 controls the tank lifting device (not shown) to expand the cleaning liquid from the supply port 13A in a hemispherical shape. The controller 2 controls the third sliding device 86 to wipe off the expanded cleaning liquid by the wipe blade 82 and to wipe off the waste ink by the wipe blade 82 while diluting the waste ink with the cleaning liquid. The wiped waste ink drops into the opening 83A of the carriage 83, and is stored in the waste ink tank 59 through the discharge port (not shown) of the carriage 83.

Figure 20:
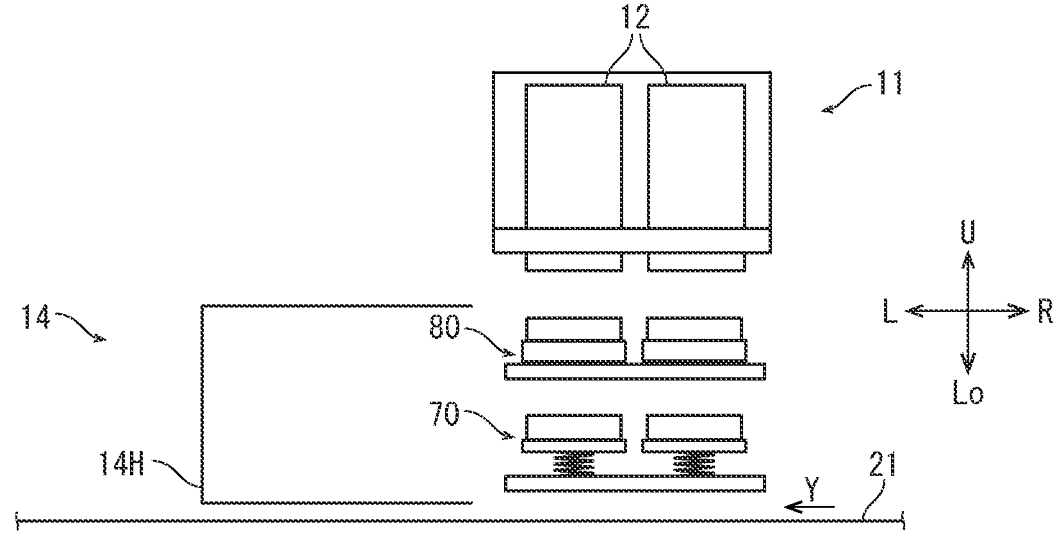
FIG. 20 is a sectional view explaining the operation of the printer according to the embodiment of the present disclosure.
Figure 21:
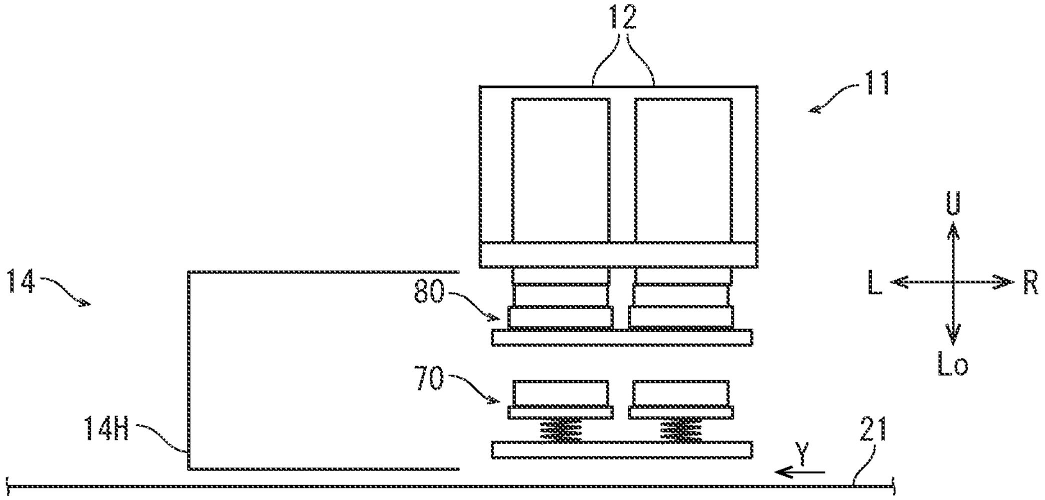
FIG. 21 is a sectional view explaining the operation of the printer according to the embodiment of the present disclosure.

Next, the controller 2 controls the first moving device (the head lifting device 61) to lift the head unit 11 to the retreat position (see FIG. 20). Next, the controller 2 controls the second sliding device 85 to slide the cleaning unit 80 to the non-facing position (see FIG. 19). Next, the controller 2 controls the head lifting device 61 to lower the head unit 11 to a height at which the nozzle surface 12N comes into contact with the cap 72 (see FIG. 17 and FIG. 18). In a case where the waste ink remaining on the nozzle surface 12N drops in the cap 72, the waste ink flows from the high side to the low side of the bottom portion 72B of the recessed part 72U of the cap 72, and is stored in the waste ink tank 59 through the discharge port 72A. Further, by covering the nozzle surface 12N with the cap 72, the increase in viscosity of the ink and the drying of the ink in the nozzle are suppressed.

According to the printer 1 of the embodiment described above, the controller 2 controls the first moving device (the head lifting device 61) to lift the inkjet head 12 to the retreat position, controls the first sliding device 75 to slide the cap 72 to the facing position, controls the cleaning liquid supply part 13 to discharge the cleaning liquid to the cap 72, and then controls the inkjet head 12 to purge the ink in the cap 72. According to this configuration, since the purged ink is diluted by the cleaning liquid and flows to the discharge port 72A, it becomes possible to prevent the ink purged to the cap 72 from staying in the cap 72.

Further, according to the printer 1 of the present embodiment, the bottom portion 72B of the recessed part 72U of the cap 72 is inclined so as to be lower from a position facing the supply port 13A in the covering position toward a position where the discharge port 72A exists. In a case where the discharge port 72A is formed in the bottom portion 72B of the recessed part 72U, the position where the discharge port 72A exists refers to the position where the discharge port 72A is formed in the bottom portion 72B of the recessed part 72U. In a case where the discharge port 72A is formed in a position other than the bottom portion 72B of the recessed part 72U, for example, in a case where the discharge port 72A is formed in the side surface of the recessed part 72, the position where the discharge port 72A exists refers to the position of the bottom portion 72B below the position where the discharge port 72A is formed. According to this configuration, since the cleaning liquid adheres to the bottom portion 72B by flowing the cleaning liquid over the bottom portion 72B of the recessed part 72U, the ink can easily flow to the discharge port 72A.

In this case, in the covering position, a range in which the discharge port is disposed on the nozzle surface 12N may be included from a position facing the supply port 13A to a position where the discharge port 72A exists. Specifically, in the present embodiment, the bottom portion 72B of the recessed part 72U of the cap 72 is inclined in one direction so that the side facing the supply port 13A is higher, and the discharge port 72A is provided on the lower side of the bottom portion 72B. According to this configuration, since the cleaning liquid flows from the high side to the low side of the bottom portion 72B of the recessed part 72U, the cleaning liquid adheres to the entire surface of the bottom portion 72B, the ink can easily flow to the discharge port 72A.

According to the printer 1 of the present embodiment, the controller 2 may perform the following processing after it controls such that the ink is purged to the cap 72. The controller 2 controls the third moving device (the second sliding device 85 and the head lifting device 61) to arrange the cleaning unit 80 and the inkjet head 12 having the nozzle surface 12N in the cleaning position in which the cleaning unit 80 cleans the nozzle surface 12N. Thereafter, the controller 2 controls the cleaning liquid supply part 13 and the cleaning unit 80 to clean the nozzle surface 12N. Thereafter, the controller 2 controls the third moving device (the second sliding device 85 and, if necessary, the head lifting device 61) to arrange the cleaning unit 80 and the inkjet head 12 having the nozzle surface 12N in the non-facing position. Thereafter, the controller 2 controls the second moving device (the first sliding device 75 and the head lifting device 61) to arrange the cap 72 and the nozzle surface 12N to the covering position in which the cap 72 covers the nozzle surface 12N.

According to this configuration, it is possible to make it difficult to dry the ink in the ejection ports on the nozzle surface 12N. The cap 72, the nozzle surface 12N and the supply port 13A in this case may be arranged in a second covering position in which the nozzle surface 12N is covered with the cap 72 and the supply port 13A is not covered with the cap 72.

In the present embodiment, the shift from the cleaning position to the covering position can be performed such that the controller 2 controls the second sliding device 85 to slide the cleaning unit 80 to the non-facing position, and then controls the head lifting device 61 to lower the inkjet head 12. This simplifies the control. The controller 2 may control the head lifting device 61 to lift the inkjet head 12 before it controls the second sliding device 85 to slide the cleaning unit 80 to the non-facing position.

The above embodiment may be modified as follows.

The above embodiment shows an example in which after the cleaning liquid supply part 13 is controlled to discharge the cleaning liquid to the cap 72, the inkjet head 12 is controlled to purge the ink to the cap 72. However, it may be configured such that after the ink is purged to the cap 72, the cleaning liquid supply part 13 is controlled to discharge the cleaning liquid to the cap 72. According to this configuration, since the ink is further diluted by the cleaning liquid discharged after the purging, the ink can easily flow to the discharge port 72A.

Figure 22:
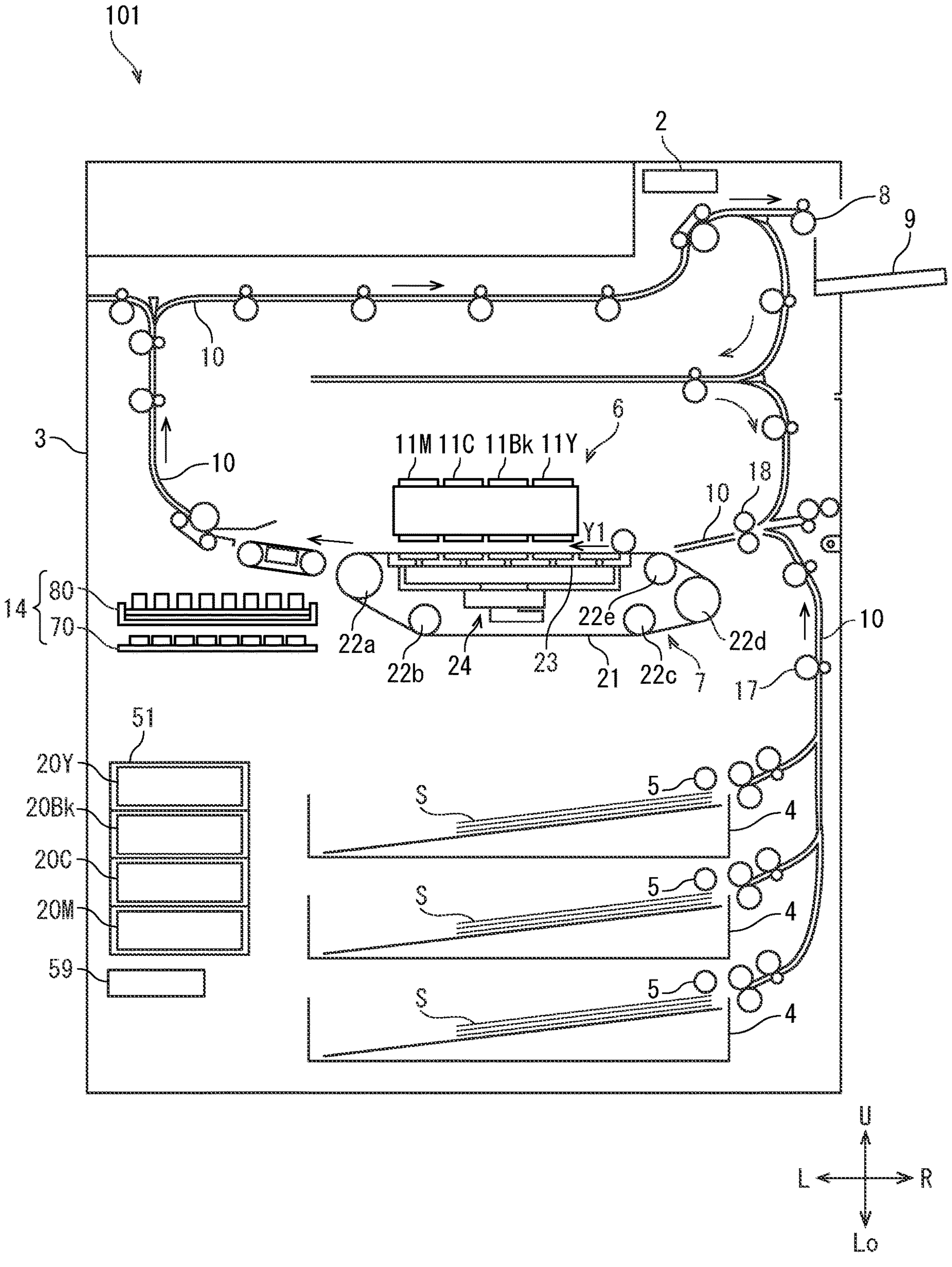
FIG. 22 is a front view schematically showing an inner structure of a printer of a modified example of according to one embodiment of the present disclosure.

The above embodiment shows an example in which the present disclosure is applied to the printer 1 in which the maintenance unit 14 is provided on the left or right side of each head unit 11 for each head unit 11. However, the present disclosure may be applied to the printer 101 in which the maintenance unit 14 having the capping unit 70 and the cleaning unit 80 provided for all of the colors (the four colors in the above embodiment) is provided on the left or right side of the image forming unit 6 (see FIG. 22). In this case, a device (not shown) for lifting the conveyance unit 7 may be configured to enlarge the space between the image forming unit 6 and the conveyance unit 7. The configuration of the components of the printer 101 is similar to the components with the same reference numerals in the printer 1 of the above embodiment, and therefore the description thereof will be omitted.

Although the present disclosure has been described with respect to specific embodiments, the present disclosure is not limited to the embodiments described above. Those skilled in the art will be able to modify the above embodiments without departing from the scope and spirit of the present disclosure.

The invention claimed is:

1. An inkjet recording apparatus comprising:

a nozzle surface from which an ink is ejected;

a supply port which supplies a cleaning liquid for cleaning the nozzle surface;

a conveyance unit which conveys a sheet along a conveyance path facing the nozzle surface;

a first moving device which arranges the nozzle surface and the conveyance unit in an image forming position in which an image forming operation is performed and a retreat position in which a distance between the nozzle surface and the conveyance unit is larger than the distance in the image forming position;

a cap having a recessed part whose upper surface is opened and a discharge port through which the liquid dropped in the recessed part is discharged;

a second moving device which arranges the cap, the nozzle surface and the supply port in a covering position in which the cap covers the nozzle surface and the supply port and in a non-covering position in which the cap and the nozzle surface are separated from each other; and a controller which controls the first moving device to arrange the nozzle surface and the conveyance unit in the retreat position, then controls the second moving device to arrange the cap, the nozzle surface and the supply port in the covering position, then controls such that the cleaning liquid is discharged from the supply port to the cap, and then controls such that the ink is purged from the nozzle surface to the cap, wherein a bottom portion of the recessed part is inclined from a position facing the supply port in the covering position to a position of the discharge port.

2. The inkjet recording apparatus according to claim 1, wherein the discharge port is formed in the bottom portion of the recessed part.

3. The inkjet recording apparatus according to claim 1, further comprising:

a waste ink tank communicated with the discharge port, wherein the purged ink is diluted by the cleaning liquid discharged in the cap and then stored in the waste ink tank through the discharge port.

4. The inkjet recording apparatus according to claim 1, wherein the controller controls such that the cleaning liquid is discharged from the supply port after the ink is purged in the cap.

5. The inkjet recording apparatus according to claim 1, further comprising:

a cleaning unit which cleans the nozzle surface;

a third moving device which arranges the cleaning unit and the nozzle surface in a cleaning position in which the cleaning unit cleans the nozzle surface and a non-cleaning position in which the cleaning unit and the nozzle surface are separated from each other farther than the cleaning position, wherein the controller controls such that the ink is purged in the cap, then controls the third moving device to arrange the cleaning unit and the nozzle surface in the cleaning position, then controls the cleaning unit to clean the nozzle surface, then controls the third moving device to arrange the cleaning unit and the nozzle surface in the non-cleaning position, and then controls the second moving device to arrange the cap, the nozzle surface and the supply port in the covering position.

* * * * *